United States Patent
Xue et al.

(10) Patent No.: US 11,388,604 B2
(45) Date of Patent: Jul. 12, 2022

(54) METHODS AND APPARATUS FOR AN AUTONOMOUS DOWNLINK TRANSMISSION

(71) Applicant: QUALCOMM Incorporated, San Diego, CA (US)

(72) Inventors: Yisheng Xue, San Diego, CA (US); Jing Sun, San Diego, CA (US); Aleksandar Damnjanovic, Del Mar, CA (US); Xiaoxia Zhang, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 16/783,372

(22) Filed: Feb. 6, 2020

(65) Prior Publication Data

US 2020/0260292 A1    Aug. 13, 2020

Related U.S. Application Data

(60) Provisional application No. 62/802,468, filed on Feb. 7, 2019.

(51) Int. Cl.
*H04W 4/00* (2018.01)
*H04W 16/14* (2009.01)
(Continued)

(52) U.S. Cl.
CPC ......... *H04W 16/14* (2013.01); *H04W 72/042* (2013.01); *H04W 72/0413* (2013.01); *H04W 74/0816* (2013.01)

(58) Field of Classification Search
None
See application file for complete search history.

(56) References Cited

U.S. PATENT DOCUMENTS

2018/0227936 A1\* 8/2018 Yerramalli .......... H04L 27/2662
2021/0176033 A1\* 6/2021 Oteri .................. H04L 5/14

FOREIGN PATENT DOCUMENTS

WO      2018103002 A1    6/2018

OTHER PUBLICATIONS

Qualcomm Incorporated, 3GPP TSG RAN WG1 Meeting #95 R1-1813416 Agenda item 7.2.2.4.4, "Enhancements to configured grants for NR unlicensed", Nov. 12-Nov. 16, 2018 (Year: 2018).*
(Continued)

*Primary Examiner* — Clemence S Han
(74) *Attorney, Agent, or Firm* — Qualcomm Incorporated

(57) ABSTRACT

A method, apparatus, and computer-readable medium that enable and disable autonomous downlink transmission (ADT) capability at a user equipment (UE) or a gNB are disclosed. The ADT capability is enabled when a triggering event occurs. The ADT capability is realized in part via initiating a listen before talk (LBT) procedure of a first LBT type to obtain an uplink (UL) transmission opportunity (TxOP) after determining that the UE does not have any UL data to transmit, transmitting uplink control information (UCI) with a limited amount of data to request for a resource grant of the TxOP for pending DL data; and receiving the pending DL data, wherein resources for receiving the pending DL data is dynamically configured via the UCI or semi-statically configured through a radio resource control (RRC) protocol message.

30 Claims, 12 Drawing Sheets

(51) Int. Cl.
*H04W 72/04* (2009.01)
*H04W 74/08* (2009.01)

(56) References Cited

OTHER PUBLICATIONS

International Search Report and Written Opinion—PCT/US2020/017228—ISA/EPO—dated Apr. 30, 2020.

* cited by examiner

METHODS AND APPARATUS FOR AN AUTONOMOUS DOWNLINK TRANSMISSION

CROSS-REFERENCE TO RELATED APPLICATION

This application claims the benefit of U.S. Provisional Application Ser. No. 62/802,468, entitled "METHODS AND APPARATUS FOR AN AUTONOMOUS DOWNLINK TRANSMISSIONS", filed on Feb. 7, 2019, the entire content of which is expressly incorporated by reference herein in its entirety.

BACKGROUND

Field

The present disclosure relates generally to wireless communication, and more particularly, to opportunistic autonomous downlink (ADL) transmissions.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. In another example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. 5G communications technology may also include NR in unlicensed spectrum (NR-U).

However, as the demand for mobile broadband access continues to increase, there exists a need for further improvements in wireless communication technology. In particular, there is a need for further improvement in NR-U related technologies.

As background information, a wireless communication network is described in a generic way. A wireless communication network may include a number of base stations or node Bs (eNodeB for an LTE network or generic NB (gNB) for a 5G network) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

In some wireless communications systems such as NR-U system, a medium reservation protocols may be used to allow a wireless device to access and reserve the wireless channel in shared frequency spectrums such that the wireless device can transmit without interference from another device. One such medium reservation method is listen-before-talk (LBT) protocol that includes a clear channel assessment (CCA) procedure that senses and determine whether a target wireless channel or medium is busy or available for transmission. There is also resource reservation procedure that includes the exchange of request to send (RTS) signals and clear to send (CTS) signals to request for and reserve the target wireless channel. The wireless device that has data ready to transmit may first transmit an RTS signal to the intended recipient, after ascertaining the wireless channel is clear to send. The recipient may send a CTS signal to grant the transmission.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In the present disclosure, it may occur that when there is a large amount of pending DL data to be transmitted to a UE while there is an uplink transmission opportunity (TxOP) available and yet the UE does not have any UL data to transmit. For an improved utilization of shared radio spectrum, an ADL transmission (ADT) capability may be enabled for the base station and UE to carry out an opportunistic DL data transmission, making use of the available UL TxOP.

In an aspect of the disclosure, a method, a computer-readable medium, and an apparatus are provided. An apparatus which may be 5G UE, is configured to receive a_triggering_event indicating that the UE has pending downlink (DL) traffic. The UE is further configured to receive a configuration command from a serving gNB to enable an ATD capability at the UE. Enabling the ATD capability at least involves initiating an LBT procedure to obtain a TxOP for the pending DL traffic and receiving the pending DL traffic without waiting for an acknowledgement (ACK) during the UL TxOP.

In another aspect of the disclosure, a method and apparatuses are provided. The apparatus, which may be a gNB, is configured to inform a user equipment (UE) via a triggering event that there is pending downlink (DL) data to be transmitted to the UE and transmit a first configuration command to the UE to enable an ADT capability at the UE. Enabling ADT capability involve a listen before talk (LBT) procedure to grant an uplink (UL) transmission opportunity (TxOP) to the UE. Enabling the UE ADT capability also involve receiving an uplink control information (UCI) message with a limited amount of data to request a downlink data transmission and transmitting the pending DL traffic without sending for an acknowledgement (ACK) during the UL TxOP.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
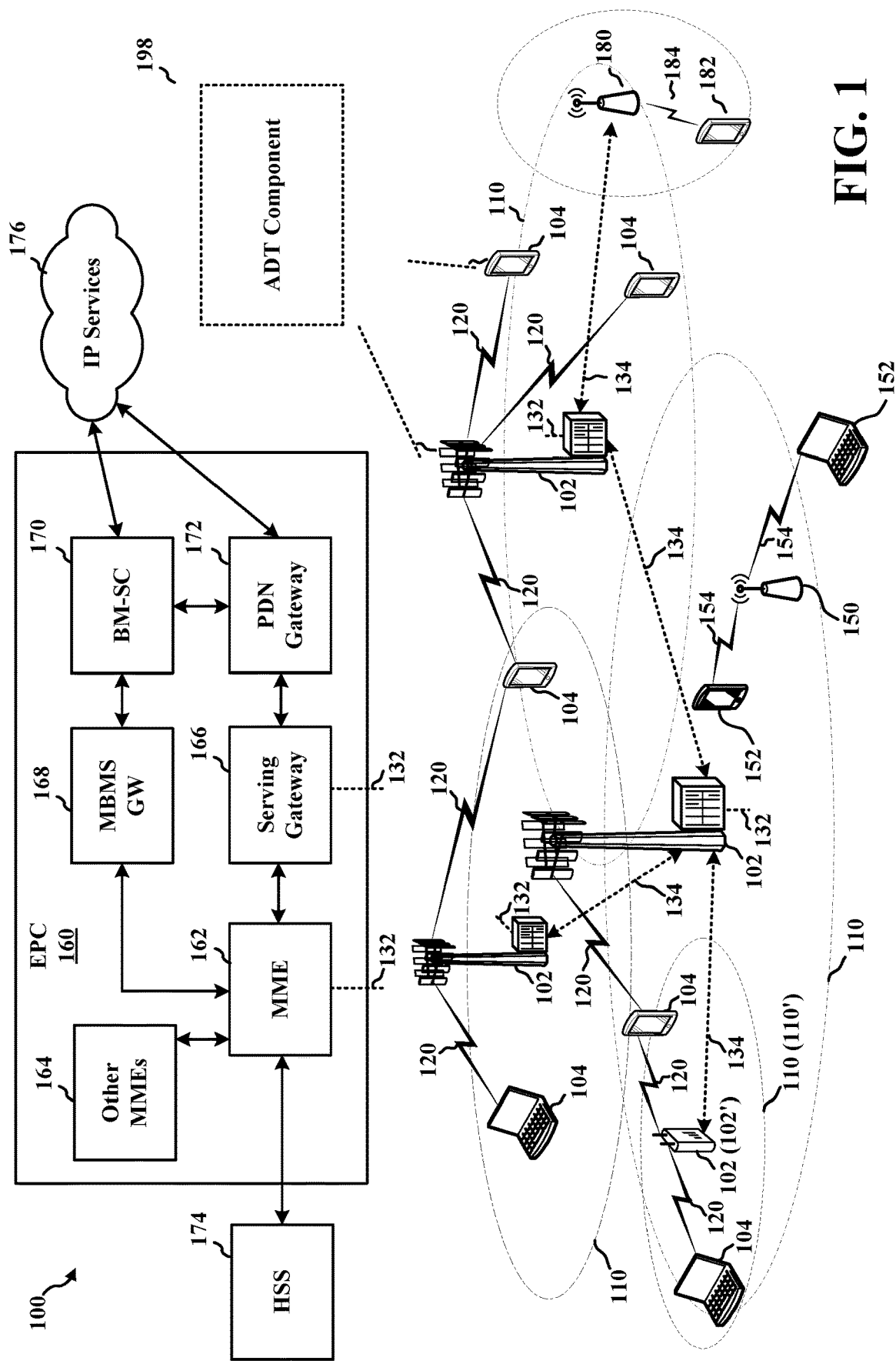
FIG. 1 is a diagram illustrating an example of a wireless communications system and an access network with multiple UEs, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The geographic coverage area 110 for a base station 102 may be divided into sectors or cells making up only a portion of the coverage area (not shown). The wireless communication network 100 may include base stations 102 of different types (e.g., macro base stations or small cell base stations, described above). Additionally, the plurality of base stations 102 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 110 for different communication technologies. The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE or NR-U related technologies. The small cell 102', employing NR-U in an unlicensed frequency spectrum, may boost coverage to and/or increase capacity of the access network.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

As noted above, the base stations 102 interfaces with the EPC 160 through backhaul links 132. The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a Node B, evolved Node B (eNB), a generic Node B (gNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the eNB 102 may be configured to include an ADL Transmission component (198) that enables the capability for the opportunistic ADL transmissions between the eNB 102 and the UE 104. The capability for the opportunistic ADL transmissions may include informing the UE a triggering event that trigger the enabling of the capability for the autonomous DL transmissions, obtaining an UL TxOP and performing DL transmissions of the pending traffic, among others.

Figure 2B:
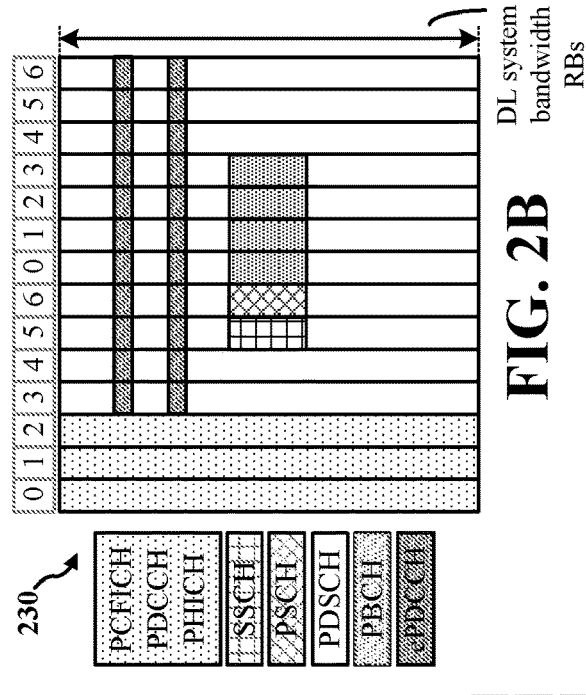
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2D:
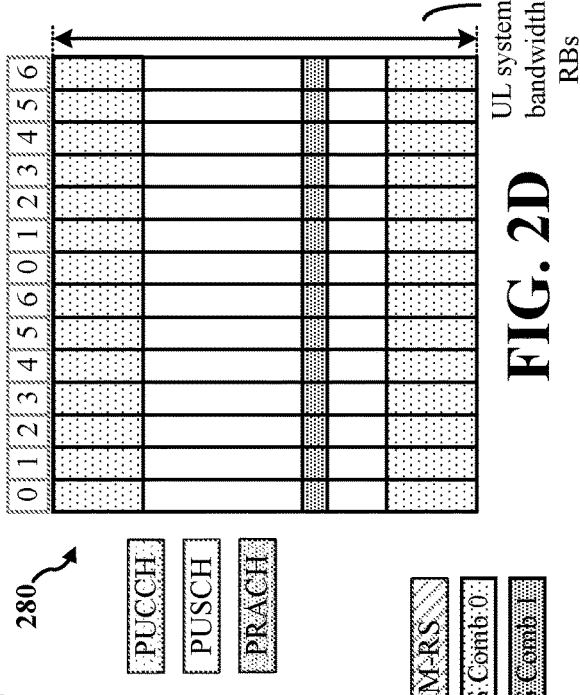
Figure 2A:
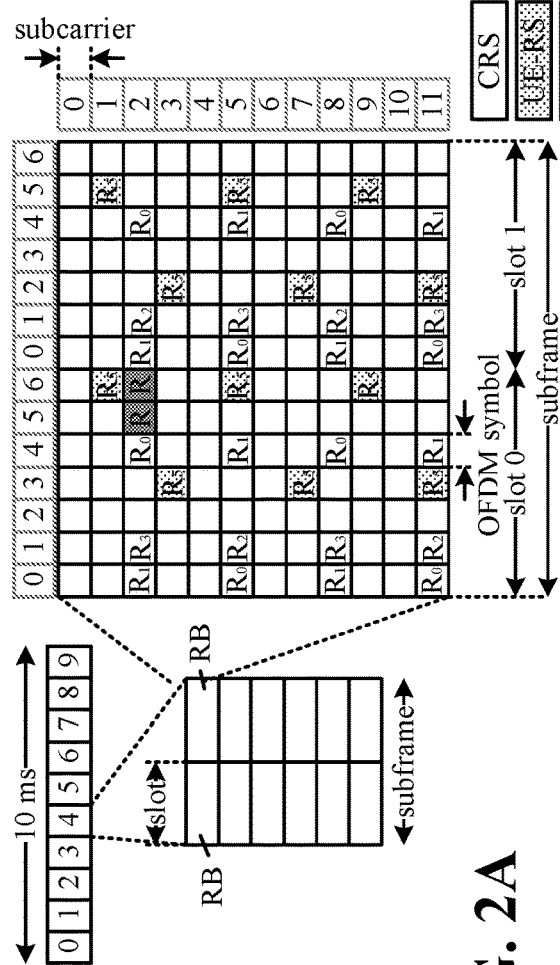
Figure 2C:
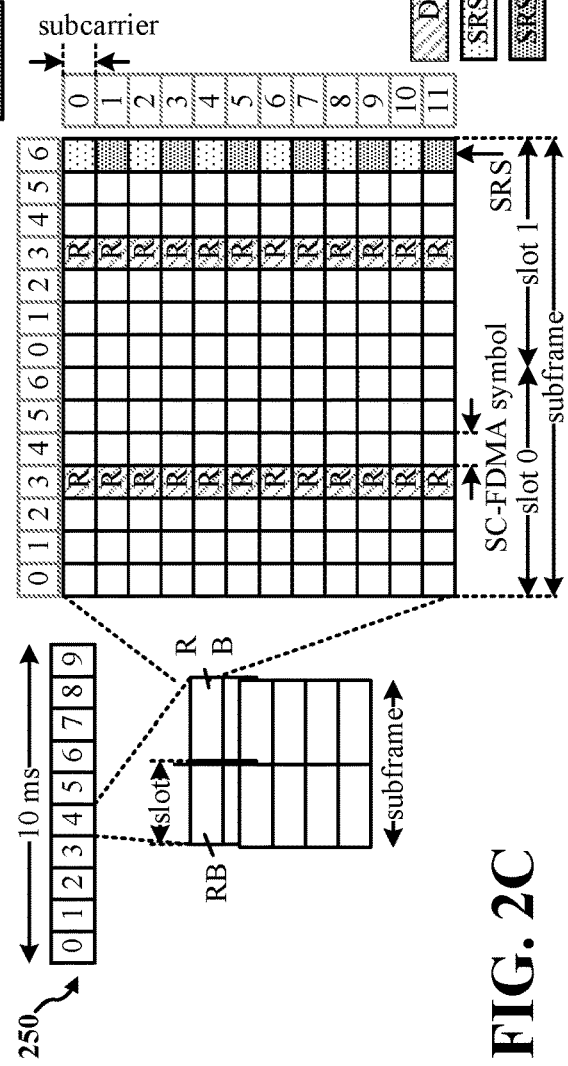

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
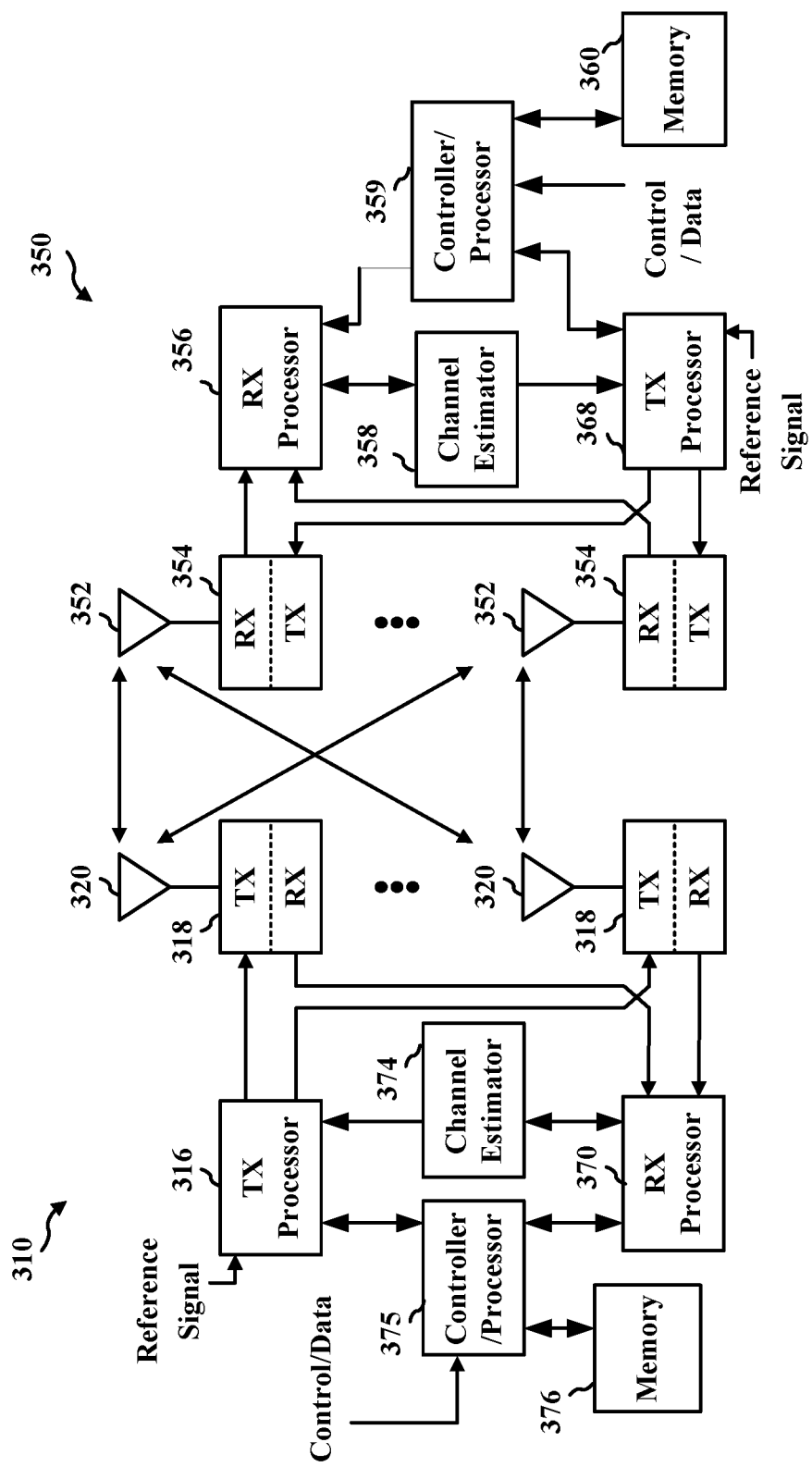
FIG. 3 is a diagram illustrating an example of an evolved Node B (eNB) and user equipment (UE) in an access network.

FIG. 3 is a block diagram of an eNB 310 in communication with a UE 350 in an access network. The eNB 310 and UE 350 may operate as described in connection with FIG. 1 and may communicate according to a set of capabilities which is determined through a capabilities exchange. In the DL, IP packets from the EPC 160 may be provided to a controller/processor 375. The controller/processor 375 implements layer 3 and layer 2 functionalities. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting. The controller/processor 375 provides a PDCP layer functionality associated with header compression/decompression, security (ciphering, deciphering, integrity protection, integrity verification), and handover support functions. The controller/processor 375 also provides an RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also provides a MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionalities.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
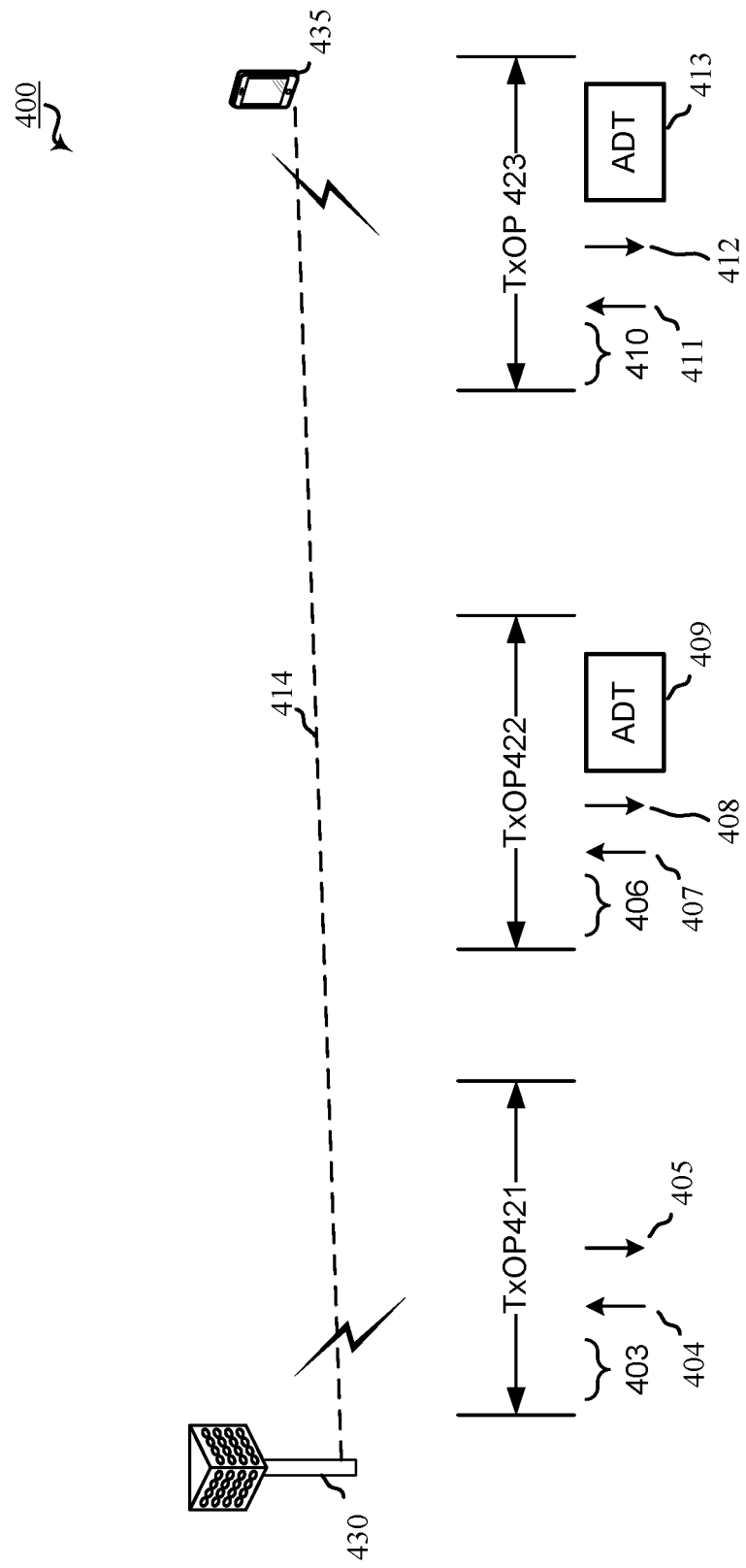
FIG. 4 is a block diagram illustrating an example NR-U network having a base station and a UE each configured with example TxOPs according to one aspect of the present disclosure.

FIG. 4 is a block diagram illustrating an example NR Unlicensed spectrum (NR-U) network 400 having base station 430 and UE 435 each configured according to one aspect of the present disclosure. NR-U network 400 at least illustrates some example aspects of ADL transmission (ADT) scenarios. The aspects may include various TxOPs and different actions that may take place during an TxOP. The illustrated portion of NR-U network 400 provides communications over multiple transmission opportunities (TxOPs 421, 422, and 423). Communications occur in NR-U network 400 over contention-based shared communication spectrum 414. Within each TxOP of TxOPs 421, 422, and 423, UE 435 may take CCA measurements over occasions TxOPs 421, 422, and 423, respectively, and reports the uplink control message including a CCA report to base station 430 at 404, 407, and 411, respectively. As illustrated previously, the CCA report can be used by base station 430 for scheduling uplink transmissions and reserving resources for ADL transmissions. Base station 430 may send grants that schedule and allocate resources for regular downlink transmission to UE 435 at 405, 408, and 412, respectively.

Resources may further be reserved for ADL transmissions as well. When analyzing the CCA report information, base station 430 may select resources for pending ADT data. The allocation of ADT resources may occur semi-statically or dynamically. Thus, based on a request from the UE 435, and the CCA report received in TxOP 421, base station 430 may determine ADT resources 409 and reports the allocated resources to each served UE, such as UE 435. Similarly, for the CCA report received in TxOP 421, base station 430 may use the CCA information from both TxOP 421 and 422 to determine the suitable ADT resources 413 for ADT data in TxOP 423.

It should be noted that various aspects of the present disclosure signal uplink control messages that include the CCA report and results, while additional aspects of the present disclosure may signal the CCA output through a light-weight sounding reference signal (SRS). The light-weight SRS may be used only to signify a clear or successful CCA, or, in alternative aspects, two different sequences of light-weight SRS may be defined one sequence that represents a clear CCA and the other sequence that represents a busy or failed CCA.

Figure 5:
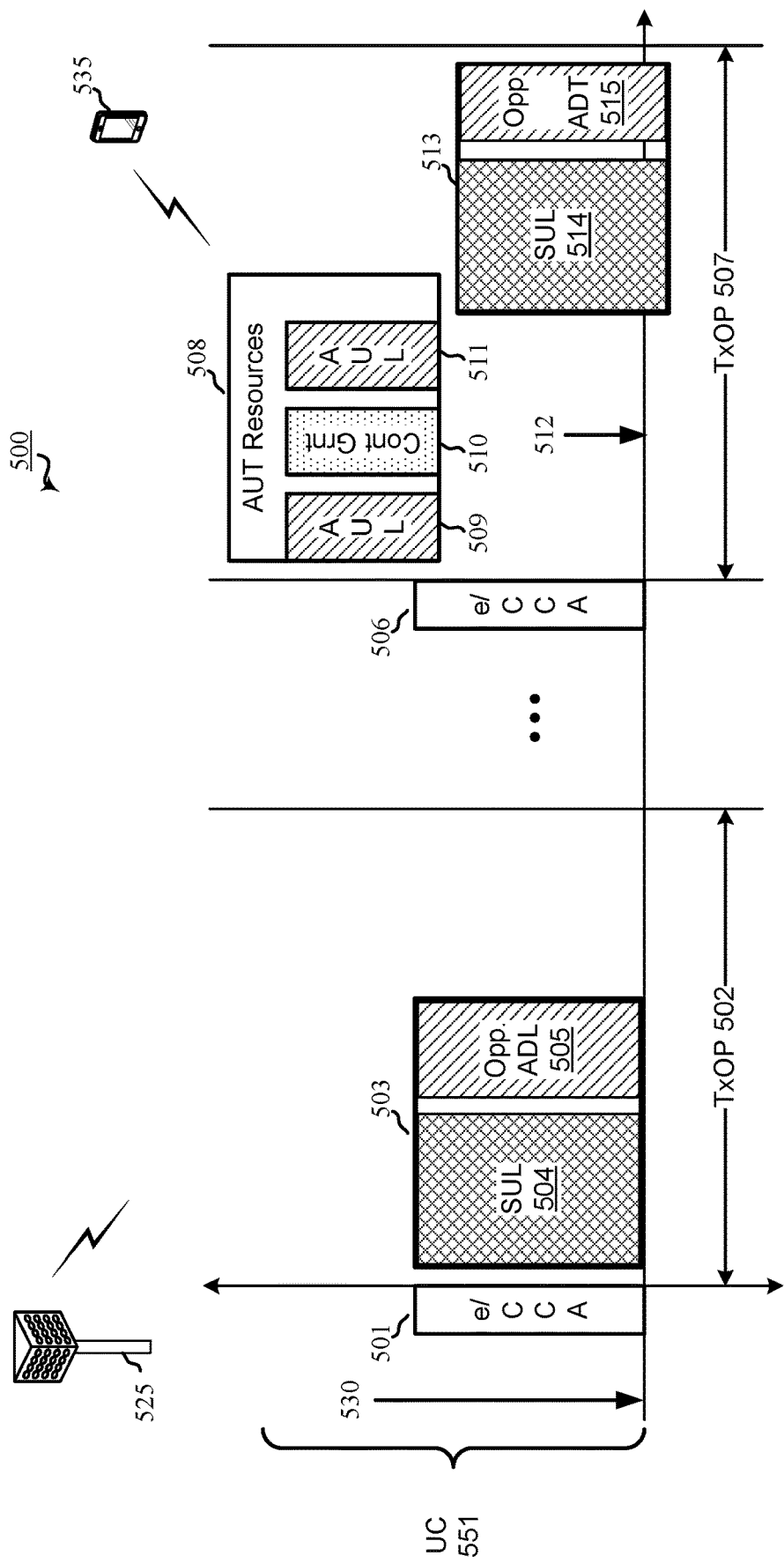
FIG. 5 is a block diagram illustrating an example NR-U network including a base station and a UE, each configured with example TxOPs according to one aspect of the present disclosure.

FIG. 5 is a block diagram illustrating a NR-U network 500 including base station 525 and UE 535, each configured according to one aspect of the present disclosure. NR-U network 500 at least illustrates support for both opportunistic autonomous uplink transmission (AUT) and autonomous downlink transmission (ADT) capabilities. Communications between base station 525 and UE 535 occurs at least using unlicensed carriers, such as unlicensed carrier 551. According to the illustrated aspect of the present disclosure, NR-U network 500 may support both opportunistic autonomous uplink (AUL) transmissions and ADL transmissions (ADT) using unused resources or degrees of freedom (DoF) of scheduled uplink (SUL) transmissions (SUT). For example, at 500, UE 535 may receive from base station 525 a downlink control indicator (DCI) signal which includes identification of a SUL grant and identification of blank radio resources (e.g., OFDM symbols, etc.) in the remaining spatial DoF(s) of the SUL allocation 503.

UE 535 may determine to conduct ADT transmissions and performs CCA or an eCCA 501. Upon successfully completing ECCA 501, UE 535 secures TxOP 502. Within SUL resource allocation 503, SUT 504 occurs. UE 535 may then perform opportunistic ADT 505 in the unused resources of SUT resource allocation 503, as identified in the DCI, if the unlicensed spectrum happens to be available, there happen to be pending downlink data to be transmitted, and there happen to be no uplink data for the UE 535 to transmit. UE 535 may perform additional AUL transmissions or ADL transmissions in configured AUL resources within TxOP 502 (not shown). When the DCI and the continuation are received simultaneously, an ongoing AUL transmission can opportunistically occupy the additional radio resources in the blank SUL allocation. For example, UE 535 may perform e/CCA 506 to secure access to unlicensed spectrum for TxOP 507. After detecting success of e/CCA 506, UE 535 may transmit the initial AUT 509 within AUT resource allocation 508. At 512, UE 535 receives both continuation grant 510 and a DCI that identifies blank resources within SUL allocation 513. UE 535 may then continue with AUT 511 within AUT resources 508. In one example aspect UE 535 perform an opportunistic ADL transmission 515 of SUT resource allocation 513 after the configured SUT 514. There may be unused resources within SUT resource allocation 513 that defines an opportunistic AUL transmission mini-COT for an AUT or ADT.

Figure 6:
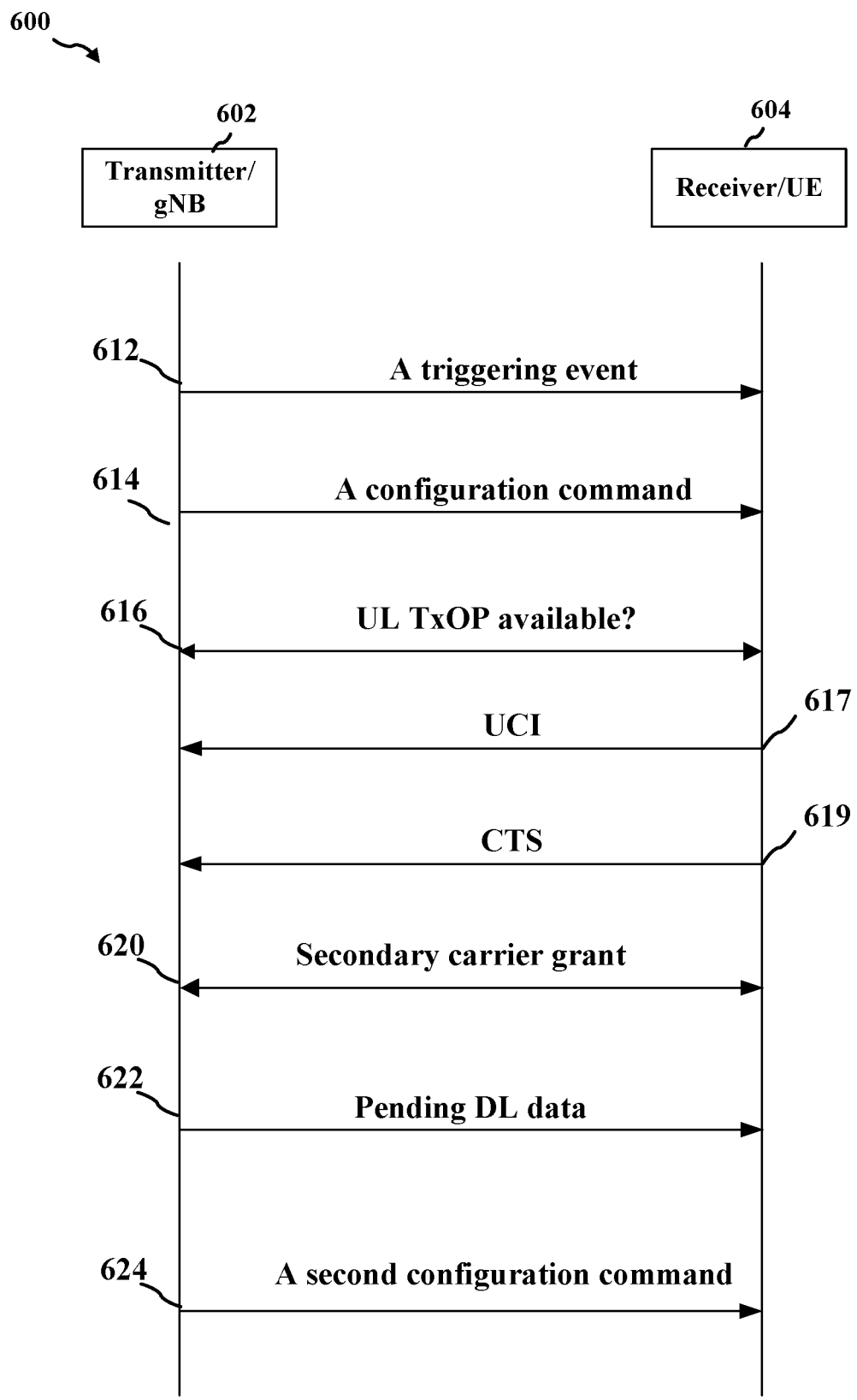
FIG. 6 illustrates an example message flow diagram for an ADT capability, according to aspects of the present disclosure.

FIG. 6 illustrates an example message flow diagram 600 for opportunistic ADL transmissions, according to aspects of the present disclosure. In one aspect, the network device 602 is a transmitter which can be implemented at a network node such as a gNB. The network device 604 may be implemented as a UE.

At block 612, a triggering event happens and gNB 602 informs UE 604 of the triggering event. The triggering event may be one condition or a combination of multiple conditions. Examples of the triggering event may include that the amount of downlink data waiting to be transmitted from gNB 602 to UE 602 has crossed a predetermined threshold; the UE 604 happens to have no uplink traffic to transmit; and there happens to be an uplink TxOP available. gNB 602 may notify the UE 604 of the triggering event via a signaling message such as a dynamic control indicator (DCI) on a physical downlink control channel (PDCCH).

At 614, gNB 602, upon occurring of the triggering event, transmits a configuration command to UE 604 to enable an ADT capability at UE 604. In response, UE 604 may take certain actions to enable the ADT capability, as described below At 616, upon receiving the configuration command to enable the ADT capability, UE 604 may initiate actions to obtain an UL TxOP. The actions may include initiating an LBT procedure to determine that the UL TxOP is available in shared spectrum. As indicated above, the LBT procedure may include a clear channel assessment (CCA) procedure to determine whether the channel in the shared spectrum is available. The LBT procedure may also include message exchange between gNB 602 and UE 604, the messages such as a request to send (RTS) message from the UE and a clear to send (CTS) message from the gNB to the UE.

At 617, upon obtaining the UL TxOP, UE 604 may send a signaling message on the PUCCH including an UL control information (UCI) to reserve the resource for the UL TxOP. The UCI may include a scheduling request for the resources needed for the TxOP. In one example aspect, UE 604 may include a broadcast clear to send (CTS) message with the UCI to let other devices/UEs in the cell know that the resources for the TxOP has been reserved.

At 618, gNB 602 or UE 604 may decide to obtain a secondary carrier to facilitate the downlink data transmission. In one example aspect, the gNB may determine to schedule a secondary carrier if the gNB 602 determines that the additional resources in shared or dedicated spectrum are available and there is a large amount of DL data waiting to be transmitted. In one example aspect, scheduling secondary carrier is optional for the gNB 602.

At 620, gNB 602 may transmit the pending DL data traffic using the scheduled UL TxOP. In one example aspect, UE 604 may receive the DL data transmission within the UL TxOP window, without sending any acknowledgement until end of the DL data transmission.

At 622, gNB 604 may determine to send another configuration command to disable the ADT capability once the pending DL data transmission is completed. The ADT capability is for opportunistic DL transmissions beyond the regular scheduled transmissions and the capability is needed when a number of conditions coincide. For example, as indicated above, the ADT capability is needed when UE happens to have no UL data to transmit, the gNB happens to have considerable amount of pending DL data for transmission, and an UL TxOP happens to be available.

The message flow chart 600 is for illustration purpose and shows one possible process for a gNB and a UE to work together to implement the ADT capability. In practice, one or more steps shown in the illustrative flowchart 600 may be combined with other steps, performed in any suitable order, performed in parallel (e.g., simultaneously or substantially simultaneously), or removed.

Figure 7:
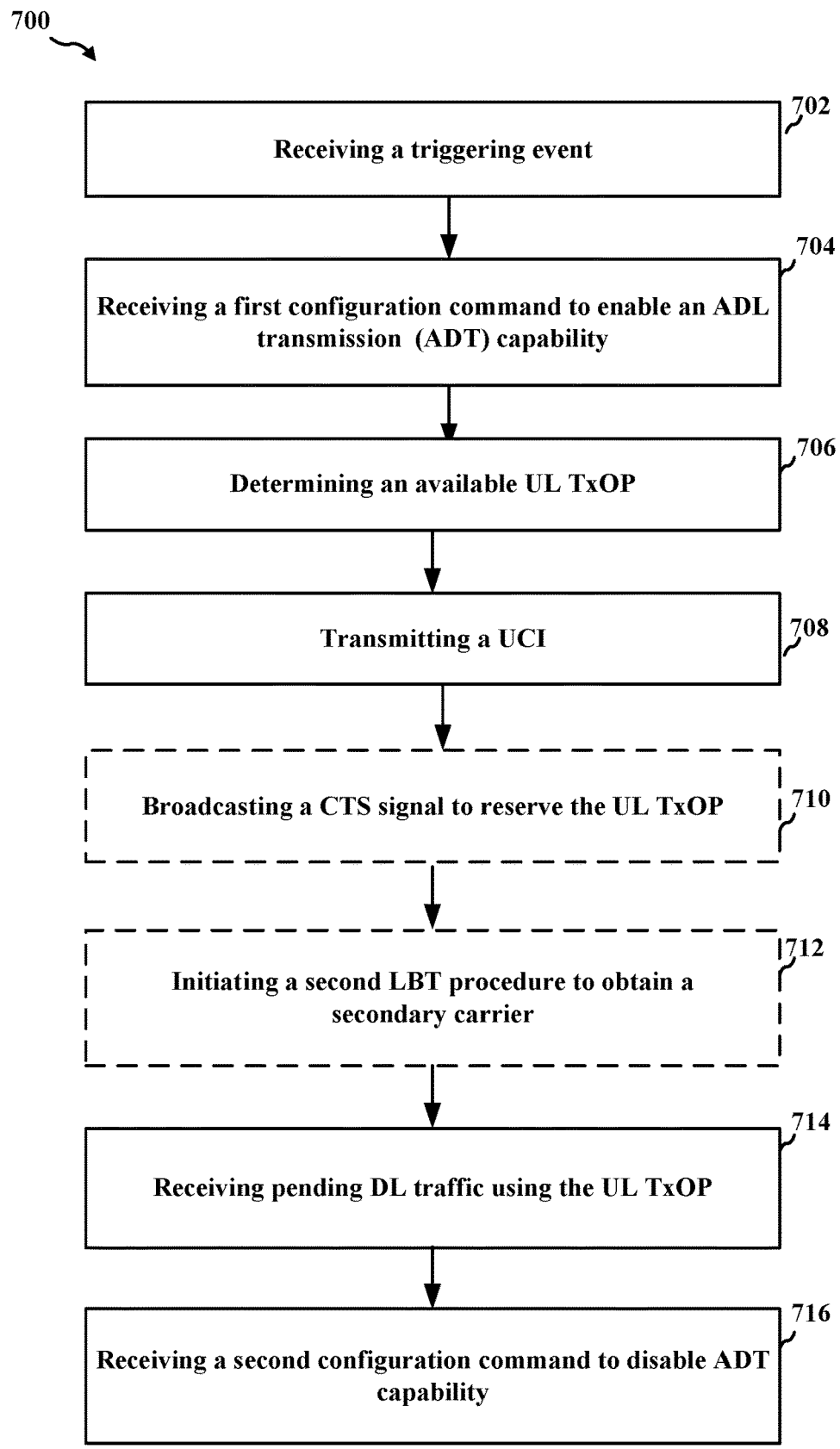
FIG. 7 is a flowchart of a method of wireless communication, according to aspects of the present disclosure.

FIG. 7 is a flowchart of a method 700 of wireless communication, according to aspects of the present disclosure. The method 700 provides one implementation of the ADT capability as described above. The method 700 may be performed by a UE such as UE 604 of FIG. 6 or any of the UE 104s of FIG. 1. The optional steps are indicated in dotted lines.

At 702, the method 700 includes receiving a triggering event. The UE may receive a notification of a triggering event that triggers a procedure for the UE to enable the opportunistic ADT capability. The triggering event may be one condition or a combination of multiple conditions. Examples of the triggering event may include that the UE received a paging message from the serving gNB or informed by an upper layer that there is a large amount of downlink data waiting to be transmitted from the serving gNB to the UE. In another example aspect, the triggering event may include that the UE happens to have no uplink traffic to transmit and there happen to be an uplink TxOP available. In another example aspect, the triggering event may include that the number of unacknowledged DL HARQ processes currently at the US has reached a predetermined threshold value. Or the UE has had bad CSI reports on its serving gNB that exceeds a predetermined number.

In one example aspect, a triggering even is caused by a "hidden node" problem. A hidden node problem may occur when a node is visible to a wireless device, but not to other nodes communicating with the wireless device. For example, when a UE is far away from its serving base station (e.g., an LTE eNB or 5G gNB) and is near an access point (AP) of a WiFi network. The AP is visible to the UE but not to the serving base station. Thus, when the serving base station transmits DL data to the UE, the AP may be transmitting its own traffic at the same time, causing interference to the DL transmission to the UE, because the base station is not aware of the presence of the AP and the AP is not aware of the presence of the base station either. Even if the AP is aware of the presence of the base station, the AP may not coordinate with the base station to avoid interferences to the UE because the WiFi network and the cellular network may belong to different operators. As a result, the downlink transmissions to the UE may have a large number of failures and the downlink data for the UE may pile up. If this happens along with some other conditions, the base station may want to notify the UE of the situation and let the UE to try to obtain an UL TxOP for ADL transmissions of the pending DL data.

The UE may receive a notification of the triggering event via a signaling message such as a downlink control indicator (DCI) on a physical downlink control channel (PDCCH) or a broadcast message. In an alternative aspect, the UE may receive an implicit indication of the triggering event, instead of an explicit notification. For example, a configuration command at block 704 may implicitly indicate the occurrence of the triggering event, as described below.

At block 704, the method 700 includes receiving a configuration command to enable an opportunistic ADT capability. The UE may receive the configuration command via a signaling message such as a DCI on a PDCCH or a broadcast message. Due to dynamic nature of radio resource scheduling and traffic conditions, the configuration command may be a dynamic signaling message command in majority of cases. In one example aspect the configuration command may implicitly indicates the occurrence of the triggering event. In one aspect, enabling the ADT capability at the UE may include the UE using an LBT procedure to compete for and obtain an available UL TxOP even though it does not have any UL traffic to transmit, upon occurring of the triggering event at block 702.

In one example aspect, the configuration command may be included in a downlink control information (DCI). The DCI may include resource allocations for the ADT capability, in addition to regular uplink/downlink resource allocations and demodulation scheme information. In an alternative aspect, the ADT resource may be semi-statically configured via an RRC configuration command.

In one example aspect, the configuration command may be initiated by the serving gNB as a result of the trigging event. In another example aspect, the configuration command of ADT capability may be sent per request by the UE. The configuration command may include a specified priority class and time granularity levels.

At block 706, the method 700 includes determining an available UL TxOP. In one example aspect, the UE may initiate an LBT procedure to determine whether the UL TxOP is available. Listen Before Talk (LBT) is a scheme for multiple devices attempting to access a shared radio resources to determine the resource availability and to resolve collision of multiple access attempts. There may be various LBT schemes, or different categories of LBT, depending on whether there is random back-off in case of a collision and the size of contention window if there is a random back-off. For example, according to certain $3^{rd}$ Generation Partnership Project (3GPP) specifications, LBT category-1 means a direct access to shared resources such as unlicensed spectrum without any LBT procedure. A category-2 LBT means an LBT procedure without a random back-off. A category-3 LBT mean an LBT procedure with random back-off with a fixed size of contention window. A category-4 LBT means an LBT procedure with a random back-off with a variable size of a contention window. In one example aspect, the LBT procedure may include a clear channel assessment (CCA) or an enhanced CCA (eCCA) procedure to determine whether a wireless transmission channel on the unlicensed spectrum is clear for transmission before the UE sends a request for access to the shared resource. In one example aspect, a cat-4 LBT procedure may be used at block 706 to determine if the TxOP is available. In one example aspect, the CCA report may be sent over a licensed frequency to improve the chance of a successful CCA transmission.

In one example aspect, support for AUL transmission may be already available in some systems. However, the time and frequency resources for ADL transmissions, as described herein, may be different than those for the AUL transmissions. For example, for the CCA or eCCA procedure to obtain the UL TxOP, different priority classes may be defined for the CAT-4 LBT procedure with different sizes of contention windows, to bias in favor of one priority class over others. In another example aspect, different time granularities may be defined for the UL TxOP to affect the frequency at which ADL transmissions may happen. For example, the UE may request for or the gNB may configure on its own that ADL transmissions happen at a specific time, such as every n slots, where n may be 1, 2, 3, 4 . . . .

At block 708, the method 700 includes transmitting an uplink control information (UCI). Upon determining that the UL TxOP is available at block 706 above, the UE may send a UCI on PUCCH to indicate to the gNB that the UL TxOP is available to the UE as a result of the LBT procedure as described at 706, and intends to use the TxOP for receiving the pending DL data. Furthermore, the UE requests that the serving gNB schedule resources for the available UL TxOP. The UCI may include a schedule request (SR) for the UL TxOP, and a HARQ ACK/NACK with or without channel selection, among other information elements. In one example aspect, the SR in the UCI may indicate some UE beam specific features related to beam Tx/Rx points, analogue receive filter related information, and beam energy levels, among others. The UCI may indicate more than one carrier in the SR. The UE may also request for some thresholds for the ADL transmission that are different than those used for regularly scheduled UL transmissions. In one example aspect, the UE may include a limited amount of data in the UCI.

At block 7010, the method 700 may include broadcasting a CTS signal. Upon determining that the UL TxOP is available at block 706 and sending to the serving gNB a schedule request for resource allocation for the UL TxOP at block 708 above, the UE may broadcast a Clear to Send (CTS) signal to let other UEs in the cell know that "someone else" has the channel and TxOP for transmission. This in effect reserves the TxOP for the UE. In an alternative example aspect, the CTS may be included in the UCI as described at block 708.

At block 7012, the method 700 includes initiating another LBT procedure to obtain a secondary carrier. The UE may optionally obtain a second component carrier when certain conditions are met. For example, when the pending downlink data is substantially large and the length of the granted TxOP is relatively limited, the UE may determine that a secondary component may help complete the DL data transmission within the TxOP. The LBT procedure may include a CCA or an eCCA procedure to determine the availability of the secondary carrier in the shared frequency spectrum. In one example aspect, the LBT procedure for obtain a secondary carrier may be different from the one used to obtain the resources for the TxOP at block 706. In one example aspect, a category-2 LBT procedure may be used to obtain the secondary carrier. The category-2 LBT procedure does not have a random back-off in case of a collision and may allow the UE to quickly acquire the secondary carrier if it is available.

At block 7014, the method 700 includes receiving pending DL traffic using the UL TxOP. After determining the TxOP is available at block 706, reserving the resources for TxOP at block 710, and optionally obtaining a secondary carrier at block 712, the UE knows where and when to receive the ADL transmissions of the pending data from the serving gNB. The UE may receive the ADL transmissions without sending a positive or negative acknowledgement (ACK/NACK) to the gNB until the end of the ADL transmissions or end of the TxOP. The UE may send the ACK/NACK later through either an autonomous UL or any other configured channel, such as a PUCCH upon completing ADL transmission.

At block 7016, the method 700 includes receiving a configuration command to disable the ADT capability. In one example aspect, upon receiving the disabling configuration command, the UE may stop monitoring for the triggering event. In another example aspect, the UE may release the resources for the ADT capability, if the resources are semi-persistently scheduled for the ADT capability. The deactivation command may be carried in a DCI on a PDCCH sent from the serving gNB.

The method 700 is for illustration purpose and shows one possible process for a UE to perform the opportunistic ADL transmissions. In practice, one or more steps shown in illustrative flowchart for the method 700 may be combined with other steps, performed in any suitable order, performed in parallel (e.g., simultaneously or substantially simultaneously), or removed.

Figure 8:
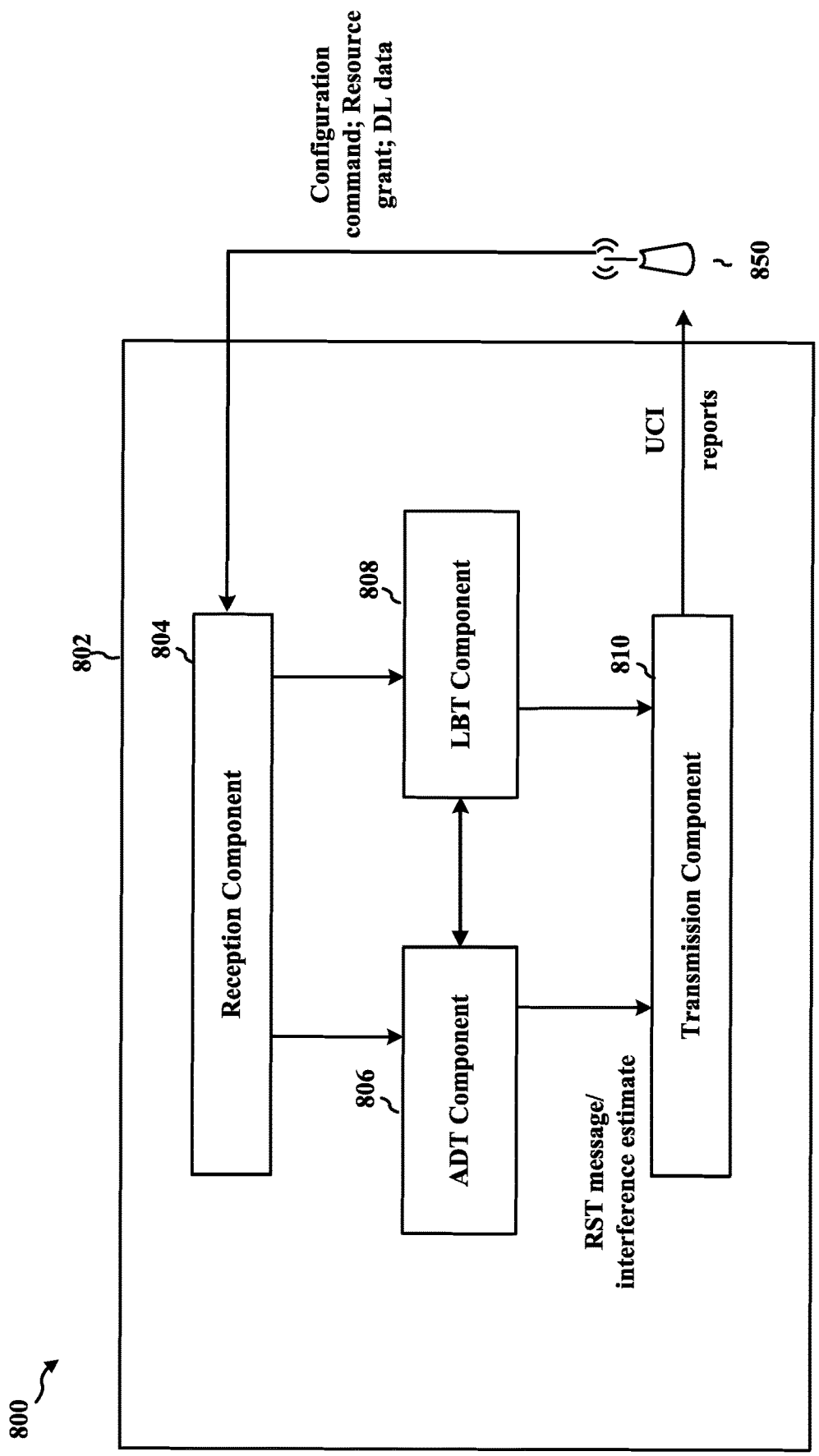
FIG. 8 is a conceptual data flow diagram illustrating the data flow between different means/components in an exemplary apparatus, according to aspects of the present disclosure.

FIG. 8 is a conceptual data flow diagram 800 illustrating the data flow between different means/components in an exemplary apparatus 802. The apparatus may be a UE such as the UE 604 of FIG. 6 or any of UEs 104 of FIG. 1. The apparatus includes a reception component 804 that receives DL communications from a network node such as a gNB 850 and a transmission component 810 that transmits uplink communications to the gNB 850. The apparatus 802 also includes an autonomous downlink transmission (ADT) component 806 that enables the ADT capability via at least an LBT component 808. The reception component 804 may receive a configuration command from the gNB 850 to enable or disable the ADT capability at the UE. The reception component 804 may also receive a resource schedule/grant for the pending DL data transmissions from the gNB. The LBT component 808 that may interact with the reception component 804, the ADT component 806, and the transmission component 810 to carry an LBT procedure as requested by the ADT component 806. For example, the LBT component 808 may carry out a CCA or eCCA procedure in collaboration with other components to determine whether a TxOP is available. The transmission component 810 that may transmit a UCI and various uplink data and reports to the gNB 850, as discussed before. The gNB 850 may respond to the apparatus 802 with a resource grant or downlink data transmissions, either scheduled or opportunistic.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Although unlicensed frequency bands are described as an example for implementation of the LBT procedure, the method described herein is applicable to licensed frequency band as well.

Figure 9:
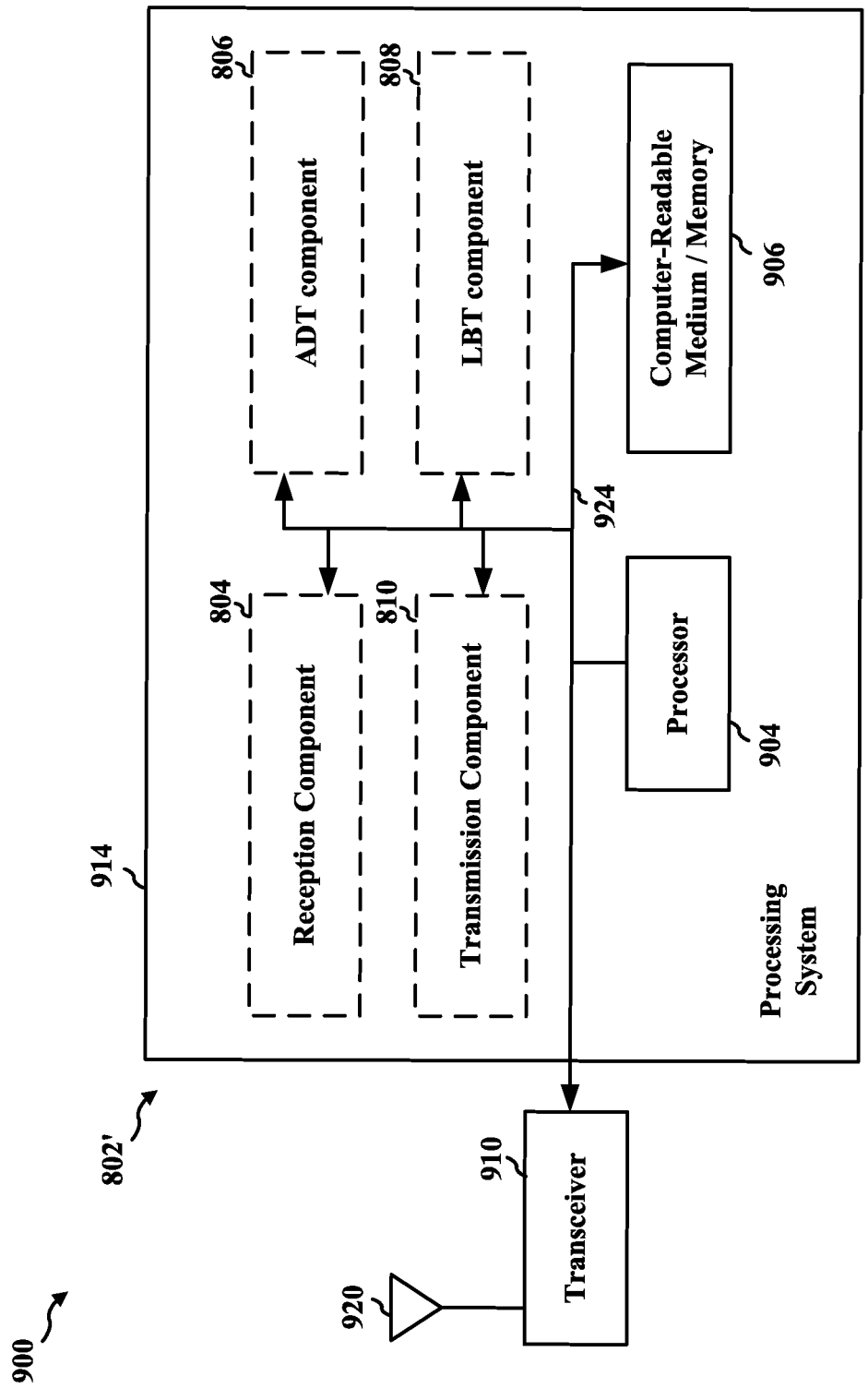
FIG. 9 is a diagram illustrating an example of a hardware implementation for an apparatus, according to aspects of the present disclosure.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 804, 806, 808, and 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 806, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system 914 further includes at least one of the components 804, 806, 808, and 810. The components may be software components running in the processor 904, resident/stored in the computer readable medium/memory 906, one or more hardware components coupled to the processor 904, or some combination thereof. The processing system 914 may be a component of the UE 350 and may include the memory 360 and/or at least one of the TX processor 368, the RX processor 356, and the controller/processor 359.

In one configuration, the apparatus 802/802' for wireless communication includes means for enabling an ADT capability at the UE upon receiving a configuration command from the serving gNB, and means for reserving resources for an UL TxOP and for receiving pending DL data using the reserved resources for the UL TxOP. The apparatus 802/802' for wireless communication also includes means for disabling the opportunistic ADT capability upon receiving another configuration command. The aforementioned means may be one or more of the aforementioned components of the apparatus 802 and/or the processing system 914 of the apparatus 802' configured to perform the functions recited by the aforementioned means. As described supra, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
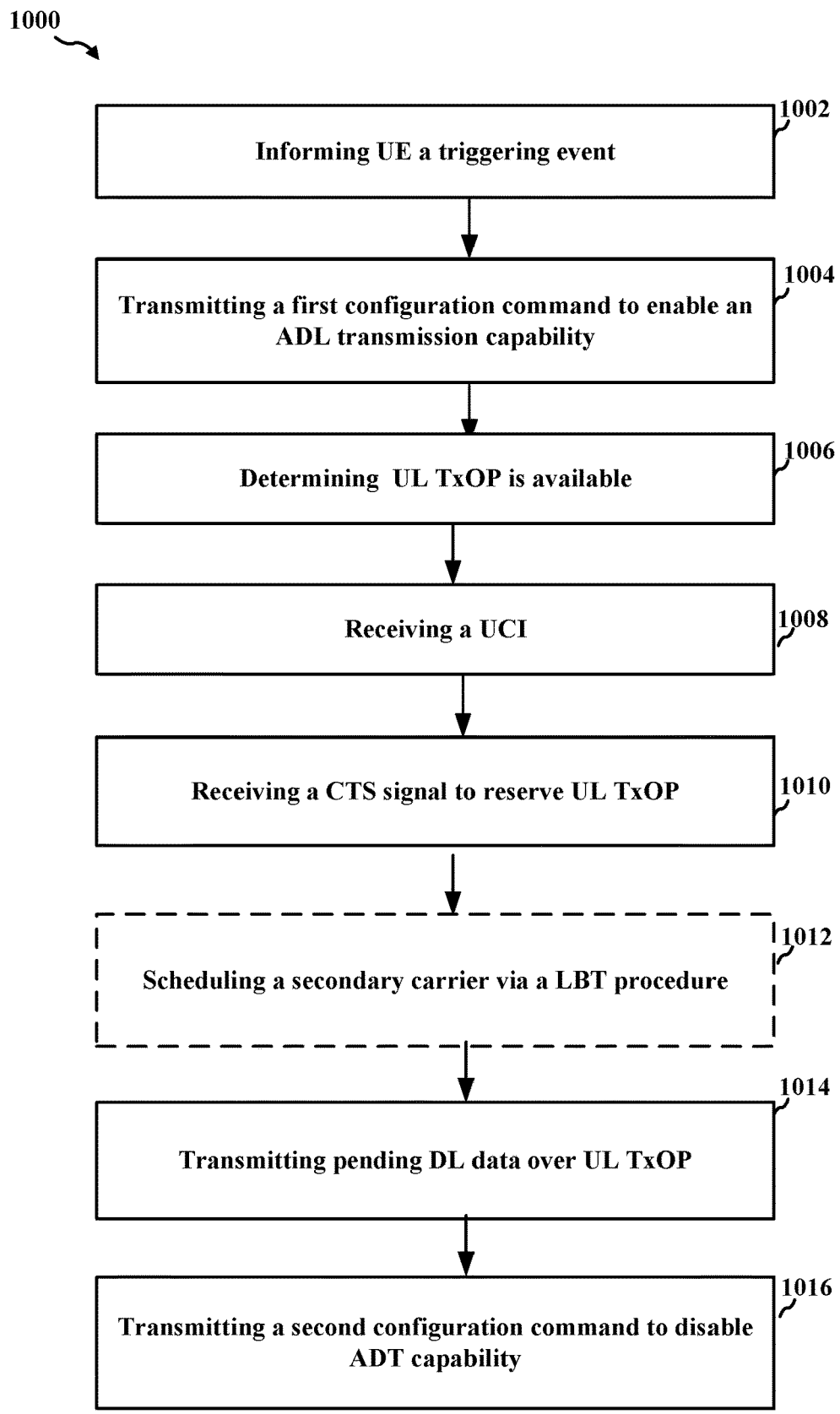
FIG. 10 is a flowchart of a method of wireless communication, according to aspects of the present disclosure.

FIG. 10 is a flowchart of a method 1000 of wireless communication, according to aspects of the present disclosure. The method 1000 provides one implementation of the ADT capability at a network node such as a gNB. For example, the method 1000 may be performed by a base station such as the gNB 602 of FIG. 6 or any of the base station 102s of FIG. 1. The optional steps are indicated in dotted lines.

At 1002, the method 1000 includes informing an associated UE a triggering event. The gNB may send a notification of the triggering event that triggers a procedure for the UE to enable the ADL transmission (ADT) capability. The triggering event may be one condition or a combination of multiple conditions. Examples of the triggering event may include that the gNB sent a paging message indicating that there is a large amount of downlink data waiting to be transmitted from the gNB to the UE. In another example aspect, the triggering event may include that the UE happens to have no uplink traffic to transmit and there happen to be an uplink TxOP available. Or the UE indicates to the gNB that the UE has had bad CSI conditions on the serving gNB's TxOPs.

The gNB may transmit a notification of the triggering event via a signaling message such as a downlink control information (DCI) on a physical downlink control channel (PDCCH) or a broadcast message. In an alternative aspect, the gNB may send an implicit indication of the triggering event, instead of an explicit notification. For example, a configuration command at block 1004 may implicitly indicate the occurrence of a triggering event, as described below.

At block 1004, the method 1000 includes transmitting a configuration command to enable an opportunistic ADT capability at the UE. The gNB may transmit the configuration command via a signaling message such as a DCI on a PDCCH or a broadcast message. Due to dynamic nature of radio resource scheduling and traffic conditions, the configuration command may be a signaling message in majority of cases. In one example aspect, the configuration command may implicitly indicate the occurrence of the triggering event. In one aspect, enabling the ADT capability at the UE may include allowing the UE to use an LBT procedure to compete for and obtain an available UL TxOP even though the UE does not have any UL traffic to transmit, upon occurring of the triggering event at block 1002.

In one example aspect, the configuration command may be included in a downlink control information (DCI). The DCI may include the resource allocation for the ADT capability, in addition to regular scheduled uplink/downlink resource allocations and demodulation scheme information. In an alternative aspect, the ADT resource may be semi-statically configured via an RRC configuration command.

In one example aspect, support for autonomous UL transmission (AUT) may be already available in some systems. However, the time and frequency resources for ADL transmission may be different than those for the AUL transmissions. For example, the frame structure for ADT resources may be different than that for the AUL transmissions.

In one example aspect, the configuration command may be initiated by the serving gNB as a result of the trigging event. In another example aspect, the configuration command of ADT capability may be sent per request by the UE. The configuration command may include a specified priority class and time granularity levels.

At block 1006, the method 1000 includes determining if an UL TxOP is available. In one example aspect, the base station may conduct an LBT procedure with the UE to determine whether the UL TxOP is available. There may be various LBT schemes, or different categories of LBT, depending on whether there is a random backoff in case of a collision and the size of contention window if there is a back-off. In one example aspect, a cat-4 LBT procedure may be used at block 1006.

In one example aspect, the LBT procedure may include a clear channel assessment (CCA) or an enhanced CCA (eCCA) procedure to determine whether the wireless transmission channel is clear for transmission before the UE sends a request for access to a shared resource. In another aspect, the CCA may be sent over a licensed frequency to at least improve the chance of a successful CCA transmission. The gNB determines whether the TxOP is available based on a report from the UE on the result of the CCA or eCCA procedure.

At block 1008, the method 1000 includes receiving an uplink control information (UCI). Upon determining that the UL TxOP is available at block 1006 above, the gNB may receive a UCI on a PUCCH from the UE to schedule resources for the available UL TxOP. The UCI may explicitly or implicitly indicate to the gNB that the UE has obtained the UL TxOP and intends to use the TxOP for the gNB to transmit the pending DL data. The UCI may include a schedule request (SR) for the UL TxOP, and a HARQ ACK/NACK with or without channel selection, among other information elements. In one example aspect, the SR in the UCI may indicate some UE beam specific features related to beam Tx/Rx points, analogue receive filter related information, and beam energy levels, among others The UCI may indicate more than one carrier in the SR. The UE may also request for thresholds that are different than those used for regularly scheduled UL transmissions. The gNB may grant the resource requests from the UE for the ADL transmission if doing so does not violate any resource schedule constraints at the gNB.

At block 1010, the method 1000 may include receiving a broadcast CTS signal. Upon determining that the UL TxOP is available at block 1006 and receiving from the UE a schedule request for the UL TxOP at block 1008 above, the gNB may receive a broadcast Clear to Send (CTS) signal from the UE. The CTS signal is to let other UEs in the cell know that "someone else" has the channel and TxOP for transmission. This in effect reserves the TxOP for the UE. In an alternative example aspect, the CTS may be included in the UCI as described at block 1008. Upon receiving the CTS signal, the gNB determines that the UE is ready to receive the pending DL data.

At block 1012, the method 1000 includes scheduling a secondary carrier. The UE may optionally request a secondary carrier with an LBT procedure when certain conditions are met. For example, when the pending downlink traffic is substantially large and the length of the TxOP is relatively limited, the UE may determine that a secondary component may help complete the DL data transmission within the TxOP. The LBT procedure may include a CCA or an eCCA procedure to determine the availability of the secondary carrier in the shared frequency spectrum. In one example aspect, the LBT procedure for obtain a secondary carrier may be different from the one used to schedule the TxOP at block 1006. For example, a category-2 LBT procedure may be used for scheduling the secondary carrier. The category-2 LBT procedure does not have a random back-off in case of a collision, and may allow the UE to quickly acquire the secondary carrier if it is available.

At block 1014, the method 1000 includes transmitting pending DL data using the UL TxOP. After determining the TxOP is available at block 1006, receiving the UCI for the TxOP at block 1008, and optionally scheduling a secondary carrier at block 1012, the gNB knows where and when to transmit the pending DL data to the UE. The gNB may transmit the DL data without waiting for an ACK or a NACK until the end of scheduled transmission or end of the TxOP. The gNB may receive the ACK/NACK later through either an autonomous UL channel or any other configured channel, such as a PUCCH.

At block 1016, the method 1000 includes sending another configuration command to disable the opportunistic ADT capability. In one example aspect, disabling configuration command may allow the UE to stop monitoring for a triggering event. In another example aspect, the gNB may be able to reallocate the resources previously allocated for the ADT capability, if the resources are semi-persistently scheduled. The deactivation command may be carried in a DCI on a PDCCH sent from the serving gNB.

The method 1000 is for illustration purpose and shows one possible process for a UE to perform the opportunistic ADL transmissions. In practice, one or more steps shown in illustrative flowchart for the method 1000 may be combined with other steps, performed in any suitable order, performed in parallel (e.g., simultaneously or substantially simultaneously), or removed.

Figure 11:
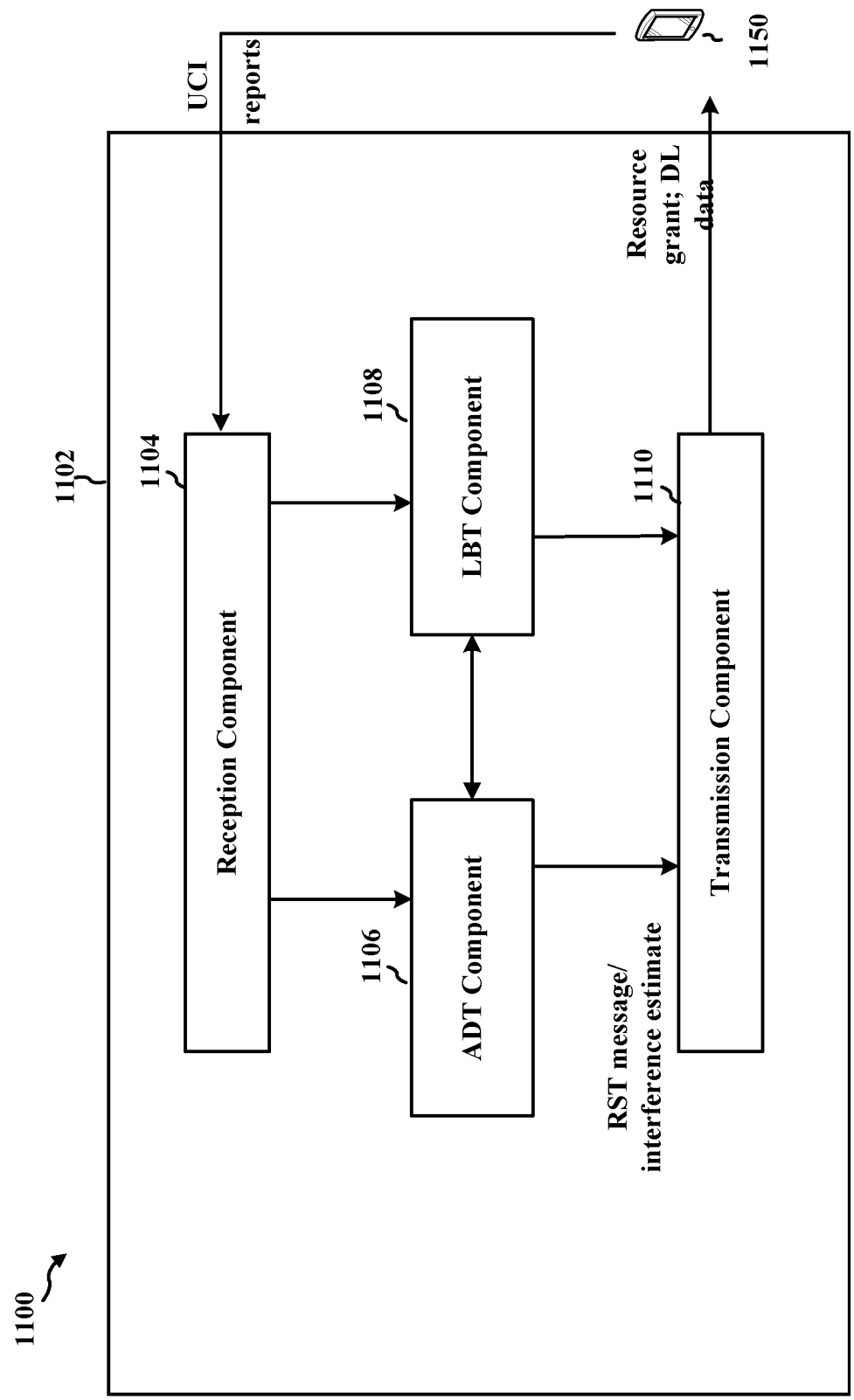
FIG. 11 is a conceptual data flow diagram illustrating the data flow between different means/components in an exemplary apparatus, according to aspects of the present disclosure.

FIG. 11 is a conceptual data flow diagram 1100 illustrating the data flow between different means/components in an exemplary apparatus 1102. The apparatus may be a based station such as the gNB 602 of FIG. 6 or any of base stations 102s of FIG. 1. The apparatus includes a reception component 1104 that receives UL communications from UE such as UE 1150 and a transmission component 1110 that transmits downlink communications to the UE 1150. The apparatus 1102 also includes an autonomous downlink transmission (ADT) component 1106 that enables the ADT capability via at least an LBT component 1108. The reception component 1104 may also receive a UCI from the UE 1150 to request resource for ADT capability. The reception component 1104 may also receive ACK/NACK report on the downlink data transmissions. The LBT component 1108 may interact with the reception component 1104, the ADT component 1106, and the transmission component 1110 to carry an LBT procedure as requested by the ADT component 1106. For example, the LBT component 1108 may carry out a CCA or eCCA procedure in collaboration with the other components to determine whether a TxOP is available. The transmission component 1110 that may transmit a configuration command to enable or disable the ADT capability at the UE and downlink data, and reports to the UE 1150, as discussed before.

The apparatus may include additional components that perform each of the blocks of the algorithm in the aforementioned flowcharts of FIGS. 6 and 10. As such, each block in the aforementioned flowcharts of FIGS. 6 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof. Although unlicensed frequency bands are described as an example for implementation of the LBT procedure, the method described herein is applicable to licensed frequency band as well.

Figure 12:
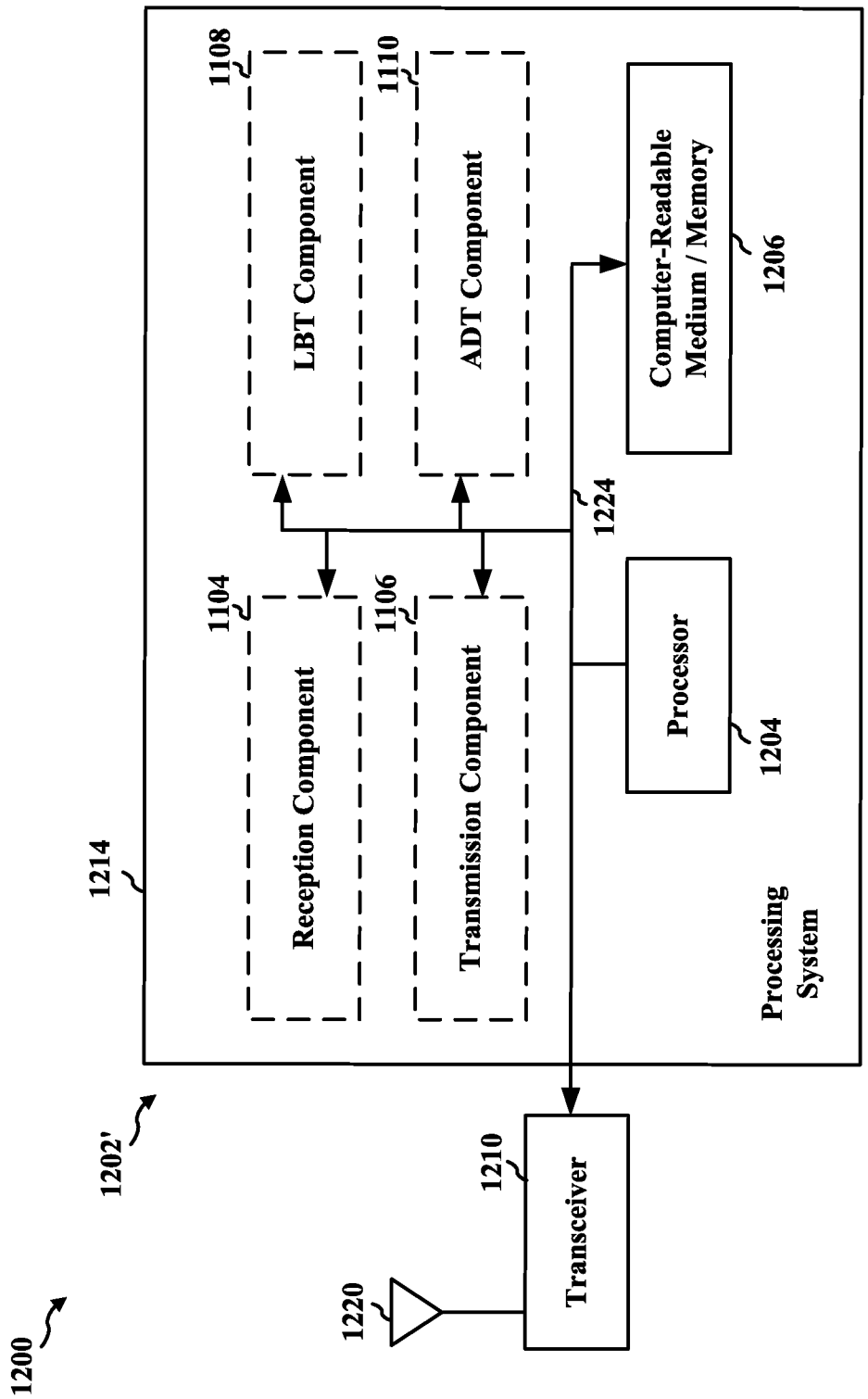
FIG. 12 is a diagram illustrating an example of a hardware implementation for an apparatus, according to aspects of the present disclosure.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, and 810, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, and 1110. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for enabling an opportunistic ADT capability at a UE by sending a configuration command to the UE, and means for scheduling an UL TxOP and for transmitting pending DL data using the reserved UL TxOP. The apparatus 1102/1102' for wireless communication also includes means for disabling the opportunistic ADT capability by transmitting another configuration command to the UE. The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a user equipment (UE) to enable an autonomous downlink transmission over a shared spectrum, comprising:
   receiving a triggering event indicating that the UE has pending downlink (DL) data;
   receiving a configuration command from a serving generic NodeB (gNB), in response to the triggering event, to enable an autonomous DL transmission (ADT) capability at the UE; and
   upon receiving the configuration command, initiating a listen before talk (LBT) procedure of a first LBT type to obtain an uplink (UL) transmission opportunity (TxOP) after determining that the UE does not have any UL data to transmit.

2. The method of claim 1, further comprising:
transmitting uplink control information (UCI) to request for allocating resources for the TxOP for the pending DL data.

3. The method of claim 2, further comprising:
broadcasting a clear to send (CTS) signal in a separate signaling message or together with the UCI to reserve the UL TxOP.

4. The method of claim 2, further comprising receiving the pending DL data using the UL TxOP, wherein allocated resources for receiving the pending DL data is dynamically configured via the UCI or semi-statically configured through a radio resource control (RRC) protocol message; and wherein radio frame structures of the allocated resources for the pending DL data are different than those for regular DL or UL data.

5. The method of claim 4, wherein the radio frame structures are allocated via at least one of:
a semi-static configuration through an RRC message;
a dynamic configuration message; or
an indication in a received downlink control information (DCI).

6. The method of claim 1, further comprising
initiating a second LBT procedure of a second LBT type for a secondary carrier for the TxOP for the pending DL data.

7. The method of claim 6, wherein the first LBT type comprises a category (CAT)-4 LBT procedure and the second LBT type comprise a CAT-2 LBT procedure;
and wherein the CAT-4 LBT procedure or/and the CAT-2 LBT procedure is UE beam specific.

8. The method of claim 1, further comprising
receiving a second configuration command from the serving gNB to disable the ADT capability.

9. The method of claim 1, wherein the ADT capability is associated with a priority class and/or a plurality of time granularities.

10. The method of claim 1, wherein the triggering event comprise one or more of:
a paging message,
an indication that the UE has a large number of unacknowledged downlink (DL) HARQ processes;
an indication from an upper layer indicating that there is a pending upper layer data; and
a number of bad channel state indicators that fall below a predetermined threshold.

11. A method for wireless communication by a generic node B (gNB) to enable an autonomous downlink transmission over a shared spectrum, comprising:
informing a user equipment (UE) via a triggering event that there is pending downlink (DL) data to be transmitted to the UE; and
transmitting a first configuration command to the UE, in response to the triggering event, to enable an autonomous DL transmission (ADT) capability at the UE; and
determining if an uplink (UL) transmission opportunity (TxOP) is available via a listen before talk (LBT) procedure of a first LBT type.

12. The method of claim 11, further comprising:
receiving an uplink control information (UCI) message to request for allocating resources for autonomous DL transmissions of the pending DL data.

13. The method of claim 12, further comprising transmitting the pending DL data on the allocated resource using the TxOP, wherein a radio frame structure of the allocated resources for the UL TxOP, is different than that for resources allocated for regular DL or UL data transmissions.

14. The method of claim 13, wherein allocation of the radio frame structure is performed via one of:
a semi-static configuration through an RRC message;
a dynamic configuration message; or
an indication in a DCI message transmitted to the UE.

15. The method of claim 11, further comprising
receiving a clear to send (CTS) indicator either by itself or together with the UCI message, in response to reserving the UL TxOP for the UE.

16. The method of claim 11, further comprising
in response to a second LBT procedure of a second LBT type initiated by the UE, allocating a secondary carrier for the UL TxOP.

17. The method of claim 16, wherein the first LBT type comprises a category (CAT)-4 LBT and the second LBT type comprise a CAT-2 LBT; and wherein the first LBT procedure or/and the second LBT procedure are UE beam specific.

18. The method of claim 16, further comprising
transmitting a second configuration command to the UE to disable the ADT capability.

19. The method of claim 11, wherein the ATD capability is associated with a plurality of time granularities and/or with a priority class.

20. The method of claim 11, wherein the triggering event comprise one or more of:
transmitting a paging message to the UE; and
transmitting an indication that the UE has a large number of unacknowledged downlink (DL) HARQ processes.

21. An apparatus for wireless communication by a user equipment (UE) to enable an autonomous downlink transmission over a shared spectrum, comprising:
means for receiving a triggering event indicating that the UE has pending downlink (DL) data;
means for receiving a configuration command from a serving generic NodeB (gNB), in response to the triggering event, to enable an autonomous DL transmission (ADT) capability at the UE; and
means for upon receiving the configuration command, initiating a listen before talk (LBT) procedure of a first LBT type to obtain an uplink (UL) transmission opportunity (TxOP) after determining that the UE does not have any UL data to transmit.

22. The apparatus of claim 21, further comprising:
means for transmitting uplink control information (UCI) to request for allocating resources for the TxOP for the pending DL data.

23. The apparatus of claim 22, further comprising:
means for broadcasting a clear to send (CTS) signal in a separate signaling message or together with the UCI to reserve the UL TxOP.

24. The apparatus of claim 22, further comprising
means for receiving the pending DL data using the UL TxOP, wherein allocated resources for receiving the pending DL data is dynamically configured via the UCI or semi-statically configured through a radio resource control (RRC) protocol message; and wherein radio frame structures of the allocated resources for the pending DL data are different than those for regular DL or UL data.

25. The apparatus of claim 21, further comprising
means for initiating a second LBT procedure of a second LBT type for a secondary carrier for the TxOP for the pending DL data.

26. An apparatus for wireless communication by a user equipment (UE) to enable an autonomous downlink transmission over a shared spectrum, comprising:

a transceiver;

a memory; and at least one processor coupled to the memory and configured to:

receive a triggering event indicating that the UE has pending downlink (DL) data;

receive a configuration command from a serving generic NodeB (gNB) to enable an autonomous DL transmission (ADT) capability at the UE, in response to the triggering event; and upon receiving the configuration command, initiating a listen before talk (LBT) procedure of a first LBT type to obtain an uplink (UL) transmission opportunity (TxOP) after determining that the UE does not have any UL data to transmit.

27. The apparatus of claim 26, wherein the at least one processor is further configured to transmit uplink control information (UCI) to request for allocating resources for the TxOP for the pending DL data.

28. The apparatus of claim 27, wherein the at least one processor is further configured to broadcast a clear to send (CTS) signal in a separate signaling message or together with the UCI to reserve the UL TxOP.

29. The apparatus of claim 27, wherein the at least one processor is further configured to receive the pending DL data using the UL TxOP, wherein allocated resources for receiving the pending DL data is dynamically configured via the UCI or semi-statically configured through a radio resource control (RRC) protocol message; and wherein radio frame structures of the allocated resources for the pending DL data are different than those for regular DL or UL data.

30. The apparatus of claim 29, wherein the radio frame structures are allocated via one of:

a semi-static configuration through an RRC message;

a dynamic configuration message; or an indication in a received downlink control information (DCI).

* * * * *